3,346,534
RESINOUS FOUNDRY CORE BINDER
Charles Tyler Bills, South Plainfield, and Peter A. Yurcick, South River, N.J., assignors, by mesne assignments, to Ashland Oil & Refining Company, Ashland, Ky., a corporation of Kentucky
No drawing. Filed June 18, 1964, Ser. No. 376,267
9 Claims. (Cl. 260—39)

This invention relates to a resinous composition having valuable properties as a binder for foundry cores and molds.

In modern production of foundry cores and molds, a mixture of sand and a binder is mulled, blown into a hot core box (350–500° F.) and partially cured therein until capable of retaining the shape of the core box. Completion of cure, following removal of the shaped mixture from the core box, is caused by residual heat retained in the mixture and by exothermic heat of reaction generated by the binder. This permits short residence time in the core box and high production rates.

Heretofore, phenol-urea-formaldehyde resins and furfuryl alcohol-urea-formaldehyde resins have been used as foundry core binders in the molding process described above. Both have serious disadvantages. Phenol-urea-formaldehyde resins are slow to cure and generate fairly high volumes of gas during cure which causes pin-holing and reduced strength in the final core. Furfuryl alcohol-urea-formaldehyde resins, though faster curing and less expensive than the phenolics, generate even more gas volumes and have very poor hot strengths in a finished core.

A novel resinous composition has now been prepared, based upon furfuryl alcohol, urea, formaldehyde, and a modifying compound selected from the group comprising melamine, dicyandiamide, benzoguanamine (trivial name for 2,4-diamino-6-phenyl-s-triazine) and mixtures thereof, which exhibits a far greater exotherm and generates less gas during cure, and imparts substantially greater hot strengths to finished cores than conventional core binders. Moreover, the resinous composition is extremely reactive and retains all of its advantages over room temperature storage periods of up to six months without gelation or loss of fluidity. The superiority of the composition of the invention is readily demonstrated by standard tests which are used to evaluate core binders in the art.

In accordance with the invention, a novel high-temperature binder is formed by reacting defined quantities of furfuryl alcohol, urea, formaldehyde and the previously-mentioned modifying compound at elevated temperature and under mildly acid conditions to form a resinous condensate which is preferably dehydrated to a final viscosity within a defined range for use as core binder. Of the three modifying compounds, benzoguanamine appears to give less retardation of cure in the hot box then melamine and very high strength in the shaped core. Thus, combinations of benzoguanamine with melamine or dicyandiamide may be used to achieve intermediate levels of final properties which might not be possible through use of any one of the three compounds alone.

The general procedure for making the resinous composition of the invention is to mix together the four reacting ingredients formaldehyde, furfuryl alcohol, modifying compound and urea. For each mol of urea in the mixture, the amounts of the remaining ingredients may be from about 2.0 to about 4.5 mols of formaldehyde, from about 0.20 to about 1.5 mols of furfuryl alcohol and from about 0.01 to about 0.5 mol of modifying compund. Initially, the pH is adjusted to 7.0 or above by addition of acid or alkali as may be required. Then the mixture is heated to a temperature within the range from about 50° C. to about 120° C. and preferably to atmospheric reflux (101° C.) over a period of about 30 minutes to establish a stabilized heated reaction mixture. If desired, heating may be continued at an alkaline pH for an additional period of ½ to 1 hour although this is not necessary.

After the mixture has been heated as described, preferably the pH is lowered to within the range from about 4.5 to 6.5 with the addition of acid. This gives the final resinous composition sufficient stability to remain reactive and useful over relatively prolonged storage periods, but where storage capability is not required as when the use is to follow immediately after preparation of the composition, the acid pH is not necessary. Various acids such as oxalic or hydrochloric acids may be used to reduce the pH. Thereafter, the mixture is continued to be heated at the elevated temperature within the range of about 50° C. to 120° C. for between ½ to 2 hours during which time the pH generally will rise slowly. Heating can be discontinued when the pH has reached a value of approximately 6.5.

Next, the resin is dehydrated, preferably under a vacuum, to a room temperature viscosity from about 3 to 30 poises. Also the pH of the finished resin is adjusted to above 7.0 and up to about 8.0 and this also helps makes the resinous composition stable during storage.

Further details of the invention will be apparent from the following examples which in the opinion of the inventors represent the best modes of carrying out the invention.

*Example 1*

To a 12 liter reaction flask equipped with a condenser were charged 5,471 grams of a 44% aqueous solution of formaldehyde and 3,173 grams of furfuryl alcohol. The pH of this mixture was adjusted to 6.9 by addition of a sufficient amount of a 25% aqueous solution of sodium hydroxide. Thereafter 1,845 grams of urea and 196 grams of melamine were added to the flask and the pH of the resulting mixture was adjusted to 7.15 by addition of formic acid.

The mixture was heated to atmospheric reflux (101° C.) and therefore the pH of the mixture was adjusted to 5.7 by addition of formic acid. Reflux was then continued for 1 hour at the end of which the pH of the mixture was approximately 6.65.

The resulting resinous composition was dehydrated under vacuum to a viscosity at 25° C. of 7.5 poises and the pH of the dehydrated composition was adjusted to 7.65 by addition of the aqueous sodium hydroxide solution used previously.

A batch of resin prepared above was used to produce a foundry core by the hot box process by first mulling 2,270 grams of Ludington sharp sand (40–50 fineness) for one minute with 9.08 grams of a conventional accelerator. Thereafter, 45.4 grams of the resin prepared above, representing 2% based on the weight of the sand, was added and mulled for 2 minutes with the sand and the accelerator. Then, the mixture was blown into a hot box mold maintained at 425° F. and gave the following results for different residence times in the mold:

| Dwell time in core box, seconds: | Tensile strength, p.s.i |
|---|---|
| 10 | 513 |
| 20 | 577 |
| 30 | 615 |
| 50 | 573 |

*Example 2*

A resin was prepared by the method described in Example 1, using for each mol of urea 0.06 mol melamine, 1.10 mol furfuryl alcohol and 2.73 mols formaldehyde. Using this resin and two others of conventional manufacture, foundry cores were prepared in the manner outlined in Example 1. The two other resins of conventional manufacture comprised a furfuryl alcohol-urea-formaldehyde resin and a phenol-urea-formaldehyde resin. All of the samples were evaluated for gas evolution during cure in the hot box and strength of the molded core at a temperature of 1,850° F. The results of these tests are given below.

| Binder | Gas Evolution, cc. | Hot Strengths at 1,850° F., pounds |
|---|---|---|
| Furfuryl alcohol-urea-formaldehyde resin | 20 | 6 |
| Phenol-urea-formaldehyde resin | 18–19 | 23 |
| Example 1 resin | 17–18 | 26 |

*Example 3*

To a 12 liter reaction flask equiped with a condenser were charged 5,471 grams of a 44% aqueous solution of formaldehyde and 3,173 grams of furfuryl alcohol. The pH of this mixture was adjusted to 6.2 by the addition of a sufficient amount of a 25% aqueous solution of sodium hydroxide. Thereafter 1,845 grams of urea and 196 grams of dicyandiamide were added to the flask and the pH of the resulting mixture was 6.95.

The mixture was heated to atmospheric reflux (101° C.) and the pH of the mixture was adjusted to 5.6 by addition of formic acid. Reflux was continued for one hour.

The resulting resinous composition was dehydrated under vacuum to a viscosity at 25° C. of 6.95 poises and a yield of 7,600 grams. The pH at this point was 7.40. It was then adjusted with a 25% aqueous solution of sodium hydroxide to 7.65.

A portion of this resin used to bond sand as outlined in Example 1 gave the following tensile strengths:

Dwell time in core box,
seconds:                   Tensile strength, p.s.i
  10 _____ 305
  20 _____ 379
  30 _____ 518

*Example 4*

To a 12 liter reaction flask equipped with a condenser were charged 5,471 grams of a 44% aqueous solution of formaldehyde and 3,173 grams of furfuryl alcohol. The pH of this mixture was adjusted to 6.7 by the addition of a sufficient amount of a 25% aqueous solution of sodium hydroxide. Thereafter 1,845 grams of urea and 196 grams of benzoguanamine were added to the flask and the pH of the resulting mixture was 7.2.

The mixture was heated to atmospheric reflux (101° C.) and the pH of the mixture was adjusted to 5.6 by the addition of formic acid. Reflux was continued for one hour.

The resulting resinous composition was dehydrated under vacuum to a yield of 7,670 grams and a viscosity at 25° C. of 8.8 poises. The pH after dehydration was complete was 7.50.

A portion of this resin used to bond sand as outlined in Example 1 gave the following tensile strengths:

Dwell time in core box,
seconds:                   Tensile strength, p.s.i
  5 _____ 405
  10 _____ 550
  20 _____ 598
  30 _____ 623
  50 _____ 630

As will be noted, in Example 2 the resin composition produced in accordance with the present invention exhibited less gas evolution and imparted greater hot strength to a molded foundry core as compared to the two resins of conventional manufacture. The hot strength is a measure of the heat resistance, and it is a particularly valuable advantage in that the binders of this invention are capable of withstanding to a greater degree than conventional materials high temperature in the core box without serious loss of strength.

While the process and the product of the invention have now been described in connection with the hot box core process for producing foundry cores and molds, the resinous composition of the invention has other applications as an industrial binder, particularly where high strength is required at elevated temperatures.

It will be understood that it is intended to cover all changes and modifications of the preferred embodiments of the invention, herein chosen for the purpose of illustration, which do not depart from the spirit and scope of the invention.

We claim:

1. Process of producing a resinous composition adapted for use as a foundry core binder which comprises forming a mixture of urea and for each mol thereof from about 2.0 to about 4.5 mols of formaldehyde and from about 0.20 to about 1.5 mols of furfuryl alcohol and from about 0.01 to about 0.5 mol of a compound selected from the group consisting of melamine, dicyandiamide, benzoguanamine and mixtures thereof, and condensing said mixture at elevated temperature to form a resinous composition.

2. Process as in claim 1 which includes the step of adjusting the pH of said mixture to within the range from about 4.5 to about 6.5 prior to condensing the same.

3. Process as in claim 2 wherein the pH of said mixture is adjusted to at least 7.0 and the mixture then heated to a temperature within the range from about 50° C. to about 120° C., prior to said step of adjusting the pH to about 4.5 to about 6.5.

4. Process as in claim 2 wherein said mixture is condensed at a temperature within the range from about 50° C. to about 120° C., after the pH therewith has been adjusted to 4.5 to about 6.5.

5. Process as in claim 1 wherein said resinous composition is dehydrated to a viscosity of from about 3 to about 30 poises at 25° C.

6. Process as in claim 5 wherein the pH of said dehydrated composition is adjusted to above 7.0.

7. Process of producing a resinous composition adapted for use as a foundary core binder which comprises forming a mixture of urea and for each mol thereof from about 2.0 to about 4.5 mols of formaldehyde and from about 0.20 to about 1.5 mols of furfuryl alcohol and from about 0.01 to about 0.5 mol of a compound selected from the group consisting of melamine, dicyandiamide, benzoguanamine and mixtures thereof, adjusting the pH of said mixture to above 7.0, heating said mixture to atmospheric reflux over a period of about 30 minutes, reducing the pH of said mixture to within the range from about 4.5 to 6.5, continuing to reflux said mixture for a period of about ½ to about 2 hours, dehydrating the resulting resinous composition to a viscosity of from about 3 to about 30 poises at 25° C. and adjusting the pH of said dehydrated composition to above 7.0.

8. A resinous composition produced by the method of claim 1.

9. A molded foundry core comprising sand and cured resinous composition produced by the method of claim 1.

References Cited

UNITED STATES PATENTS 3,059,297   10/1962   Dunn et al.
3,168,490   2/1965    Brown et al.
3,247,149   4/1966    Alek.

MORRIS LIEBMAN, *Primary Examiner.*

R. S. BARON, *Assistant Examiner.*